United States Patent
Iimura et al.

(10) Patent No.: US 9,946,615 B2
(45) Date of Patent: Apr. 17, 2018

(54) MANAGEMENT APPARATUS AND INFORMATION PROCESSING SYSTEM

(71) Applicant: FUJITSU LIMITED, Kawasaki-shi, Kanagawa (JP)

(72) Inventors: Katsuo Iimura, Yokohama (JP); Kenichirou Shimogawa, Numazu (JP); Takahiro Kojima, Yokohama (JP); Yutaka Ezaki, Kawasaki (JP); Ingyn Tara, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 177 days.

(21) Appl. No.: 15/009,876

(22) Filed: Jan. 29, 2016

(65) Prior Publication Data
US 2016/0241450 A1 Aug. 18, 2016

(30) Foreign Application Priority Data

Feb. 16, 2015 (JP) ................................ 2015-027768

(51) Int. Cl.
| H04L 27/08 | (2006.01) |
| G06F 11/20 | (2006.01) |
| H04L 12/26 | (2006.01) |
| G06F 11/30 | (2006.01) |
| G06F 11/34 | (2006.01) |

(52) U.S. Cl.
CPC ........ *G06F 11/203* (2013.01); *G06F 11/2035* (2013.01); *G06F 11/3024* (2013.01); *G06F 11/3409* (2013.01); *G06F 11/3442* (2013.01); *H04L 43/04* (2013.01); *G06F 11/2025* (2013.01); *G06F 11/2038* (2013.01); *G06F 11/2071* (2013.01); *G06F 2201/805* (2013.01)

(58) Field of Classification Search
CPC ............................ H04L 41/5054; H04L 43/04
USPC ......................................................... 709/224
See application file for complete search history.

(56) References Cited

U.S. PATENT DOCUMENTS

2015/0205643 A1* 7/2015 Miyamoto ............ G06F 9/5011
718/106

FOREIGN PATENT DOCUMENTS

| JP | 2011-197989 A | 10/2011 |
| JP | 2013-058126 A | 3/2013 |
| JP | 2013-117889 A | 6/2013 |

* cited by examiner

*Primary Examiner* — Adnan Mirza
(74) *Attorney, Agent, or Firm* — Fujitsu Patent Center

(57) ABSTRACT

A management apparatus includes a processor to collect resource usage quantities of one or more first site processes executed on an information processing apparatus of a first site, and the resource usage quantities of one or more second site processes executed on an information processing apparatus of a second site to which the processes of the first site are migrated, and to define, as resource control information, at least one of stopping any one or more of the second site processes and reducing resources allocated to any one or more of the second site processes corresponding to variations of the resource usage quantities of the first site processes and the second site processes, the resource usage quantities being collected by the processor.

7 Claims, 17 Drawing Sheets

FIG.6

| TASK | SITE | MOST UPDATED STATE | 2014/08/08 00:20 | 2014/08/08 06:20 | 2014/08/08 12:20 | 2014/08/08 12:41 |
|---|---|---|---|---|---|---|
| TASK A | REAL SITE | STARTUP | 2GHz | 1GHz | 3GHz | 3GHz |
| TASK B | REAL SITE | STARTUP | 1GHz | 1GHz | 1GHz | 1GHz |
| TASK C | REAL SITE | STARTUP | 1GHz | 2GHz | 3GHz | 3GHz |
| TASK 1 | DISASTER RECOVERY SITE | STARTUP | 1GHz | 2GHz | 2GHz | 4GHz |
| TASK 2 | DISASTER RECOVERY SITE | STARTUP | 2GHz | 1GHz | 3GHz | 3GHz |
| TASK 3 | DISASTER RECOVERY SITE | STARTUP | 3GHz | 3GHz | 3GHz | 3GHz |
| TASK 4 | DISASTER RECOVERY SITE | STARTUP | 2GHz | 2GHz | 2GHz | 2GHz |
| (FREE SPACE) | DISASTER RECOVERY SITE | - | 5GHz | 5GHz | 3GHz | 1GHz |

FIG.7

| | 2014/08/08 00:20 | 2014/08/08 06:20 | 2014/08/08 12:20 | 2014/08/08 12:41 |
|---|---|---|---|---|
| CPU FREE SPACE OF DISASTER RECOVERY SITE (A) | 5GHz | 5GHz | 3GHz | 1GHz |
| CPU USAGE QUANTITY OF REAL SITE (B) | 4GHz | 4GHz | 7GHz | 7GHz |
| INDEX VALUE X (A÷B) | 1.25 | 1.25 | 0.43 | 0.14 |
| REDEFINITION OF RECOVERY SCENARIO | NOT REDEFINED | NOT REDEFINED | REDEFINED | REDEFINED |

REDEFINE RECOVERY SCENARIO DUE TO DEFICIENCY OF FREE SPACE OF DISASTER RECOVERY SITE

REDEFINE RECOVERY SCENARIO DUE TO VARIATION PF INDEX VALUE

FIG.9

| | 2014/08/08 12:20 |
|---|---|
| CPU FREE SPACE OF DISASTER RECOVERY SITE (A) | 7GHz |
| CPU USAGE QUANTITY OF REAL SITE (B) | 10GHz |
| DEFICIENT RESOURCE QUANTITY (B − A) | 3GHz |
| INDEX VALUE X (A ÷ B) | 0.7 |
| REDEFINITION OF RECOVERY SCENARIO | REDEFINED |

40

| TASK | SITE | MOST UPDATED STATE | 2014/08/08 12:20 | | |
|---|---|---|---|---|---|
| TASK A | REAL SITE | STARTUP | 2GHz | | |
| TASK B | REAL SITE | STARTUP | 3GHz | | |
| TASK C | REAL SITE | STARTUP | 5GHz | | |
| TASK 1 | DISASTER RECOVERY SITE | STARTUP | 1GHz | 10% | |
| TASK 2 | DISASTER RECOVERY SITE | STARTUP | 4GHz | 40% | |
| TASK 3 | DISASTER RECOVERY SITE | STARTUP | 3GHz | 30% | |
| TASK 4 | DISASTER RECOVERY SITE | STARTUP | 2GHz | 20% | |
| (FREE SPACE) | DISASTER RECOVERY SITE | - | 7GHz | | |

BELOW PREDETERMINED REFERENCE LEVEL

STOP OF TASK

4GHz

FREE SPACE BECOMES 11 GHz, AND FINISH PROCESSING BECAUSE OF INDEX VALUE X ≥ 1.0

FIG.10

| | 2014/08/08 12:20 |
|---|---|
| CPU FREE SPACE OF DISASTER RECOVERY SITE (A) | 3GHz |
| CPU USAGE QUANTITY OF REAL SITE (B) | 7GHz |
| DEFICIENT RESOURCE QUANTITY (B − A) | 4GHz |
| INDEX VALUE X (A ÷ B) | 0.43 |
| REDEFINITION OF RECOVERY SCENARIO | REDEFINED |

40

| TASK | SITE | MOST UPDATED STATE | 2014/08/08 12:20 | |
|---|---|---|---|---|
| TASK A | REAL SITE | STARTUP | 1GHz | |
| TASK B | REAL SITE | STARTUP | 2GHz | |
| TASK C | REAL SITE | STARTUP | 4GHz | |
| TASK 1 | DISASTER RECOVERY SITE | STARTUP | 3GHz | 19% |
| TASK 2 | DISASTER RECOVERY SITE | STARTUP | 8GHz | 50% |
| TASK 3 | DISASTER RECOVERY SITE | STARTUP | 3GHz | 19% |
| TASK 4 | DISASTER RECOVERY SITE | STARTUP | 2GHz | 12% |
| (FREE SPACE) | DISASTER RECOVERY SITE | − | 3GHz | |

⇨ 8GHz — FREE SPACE BECOMES 11 GHz, AND FINISH PROCESSING BECAUSE OF INDEX VALUE X ≥ 1.0

FIG.12

| | 2014/08/08 12:20 |
|---|---|
| CPU FREE SPACE OF DISASTER RECOVERY SITE (A) | 1GHz |
| CPU USAGE QUANTITY OF REAL SITE (B) | 13GHz |
| DEFICIENT RESOURCE QUANTITY (B − A) | 12GHz |
| INDEX VALUE X (A ÷ B) | 0.08 |
| REDEFINITION OF RECOVERY SCENARIO | REDEFINED |

40

| TASK | SITE | MOST UPDATED STATE | 2014/08/08 12:20 | | |
|---|---|---|---|---|---|
| TASK A | REAL SITE | STARTUP | 6GHz | | |
| TASK B | REAL SITE | STARTUP | 4GHz | | |
| TASK C | REAL SITE | STARTUP | 3GHz | | |
| TASK 1 | DISASTER RECOVERY SITE | STARTUP | 2GHz | 16% | |
| TASK 2 | DISASTER RECOVERY SITE | STARTUP | 5GHz | 43% | |
| TASK 3 | DISASTER RECOVERY SITE | STARTUP | 3GHz | 25% | |
| TASK 4 | DISASTER RECOVERY SITE | STARTUP | 2GHz | 16% | |
| (FREE SPACE) | DISASTER RECOVERY SITE | − | 1GHz | | |

STOP

FREE SPACE BECOMES 13 GHz, AND FINISH PROCESSING BECAUSE OF INDEX VALUE X ≥ 1.0

MANAGEMENT APPARATUS AND INFORMATION PROCESSING SYSTEM

CROSS-REFERENCE TO RELATED APPLICATION

This application is based upon and claims the benefit of priority of the prior Japanese Patent Application No. 2015-027768, filed on Feb. 16, 2015, the entire contents of which are incorporated herein by reference.

FIELD

The embodiments discussed herein are related to a management apparatus and an information processing system.

BACKGROUND

Over the recent years, as enterprises have handled increasingly a larger quantity of data, and, e.g., cloud computing and other equivalent computing systems have spread in progress to provide flexibility to a change of system environment. When a cloud computing based system environment (which will hereinafter be termed also a cloud environment) suffers from a disaster and a damage due to a system failure, an execution environment and the data are migrated to another cloud environment for continuing tasks (the "task" is herein defined as a process executed on the cloud environment for businesses and services). In the cloud environment and other computer systems, a solution for continuing the tasks at occurrences of the disaster and other equivalent situations is called a Disaster Recovery (DR).

The DR prepares, in addition to an active operation site (which will hereinafter be termed a "real site") to run the tasks, a site for taking a countermeasure against the disaster (which will hereinafter be simply termed a "disaster recovery site") in order to migrate the tasks of the real site at the occurrences of the disaster and other equivalent situations. The disaster recovery site, which is prepared against the occurrences of the disaster and other equivalent situations, runs different tasks from those of the real site in terms of effectively utilizing resources. The tasks running on the disaster recovery site have lower priority levels than the tasks running on the real site in majority of cases.

The DR targeting on the cloud environment and other equivalent environments involves predefining the tasks on the real site, which are migrated to the disaster recovery site at the occurrences of the disaster and other equivalent situations, and some of tasks on the disaster recovery site, which are stopped for running the tasks on the real site. At the occurrences of the disaster and other equivalent situations, the tasks are switched over and stopped based on the predefinitions.

PATENT DOCUMENT

[Patent document 1] Japanese Laid-Open Patent Publication No. 2013-117889
[Patent document 2] Japanese Laid-Open Patent Publication No. 2013-058126
[Patent document 3] Japanese Laid-Open Patent Publication. No. 2011-197989

SUMMARY

According to an aspect of the embodiments, a management apparatus includes a processor to collect resource usage quantities of one or more first site processes executed on an information processing apparatus of a first site, and the resource usage quantities of one or more second site processes executed on an information processing apparatus of a second site to which the processes of the first site are migrated, and to define, as resource control information, at least one of stopping any one or more of the second site processes and reducing resources allocated to any one or more of the second site processes corresponding to variations of the resource usage quantities of the first site processes and the second site processes, the resource usage quantities being collected by the processor.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 6 is a diagram illustrating an example of management information to be collected by the management apparatus;
FIG. 7 is a diagram illustrating an example of determining whether the recovery scenario is redefined;
FIG. 9 is a diagram illustrating an example of stopping the task having a higher resource usage rate than other tasks when the disaster recovery site has the allowance in free space;
FIG. 10 is a diagram illustrating an example of stopping the task having a higher resource usage rate than a predetermined threshold value when the disaster recovery site has no allowance in free space;
FIG. 12 is a diagram illustrating an example of stopping every task of the disaster recovery site when the disaster recovery site has almost no allowance in free space.

DESCRIPTION OF EMBODIMENTS

The computer systems in the cloud environment and other equivalent environments receive repetitive changes in task configuration and frequent variations in resource usage quantity. Accordingly, the switchover and the stop of the tasks are implemented based on the predefinitions at the occurrences of the disaster and other equivalent situations, and, even with this implementation, the disaster recovery site may lack in resources and futilely stop tasks in some cases.

For example, when the resource usage quantities of the real site increase, or when a resource free space of the disaster recovery site decreases, or when loads on the respective tasks rise, such a possibility exists that the disaster recovery site lacks in the resources. On the other hand, when the resource usage quantities of the real site decrease, or when the resource free space of the disaster recovery site increases, such a possibility exists as to stop even the continuable tasks on the disaster recovery site.

An embodiment of the present invention will hereinafter be described based on the drawings. A configuration of the following embodiment is an exemplification, and the present invention is not limited to the configuration of the embodiment.

DR Solution

A DR solution is a solution for seamlessly continuing tasks by migrating an execution environment and data to another computer system when an active computer system in a cloud environment and other equivalent environments suffers from disasters and other equivalent situations.

Figure 1:
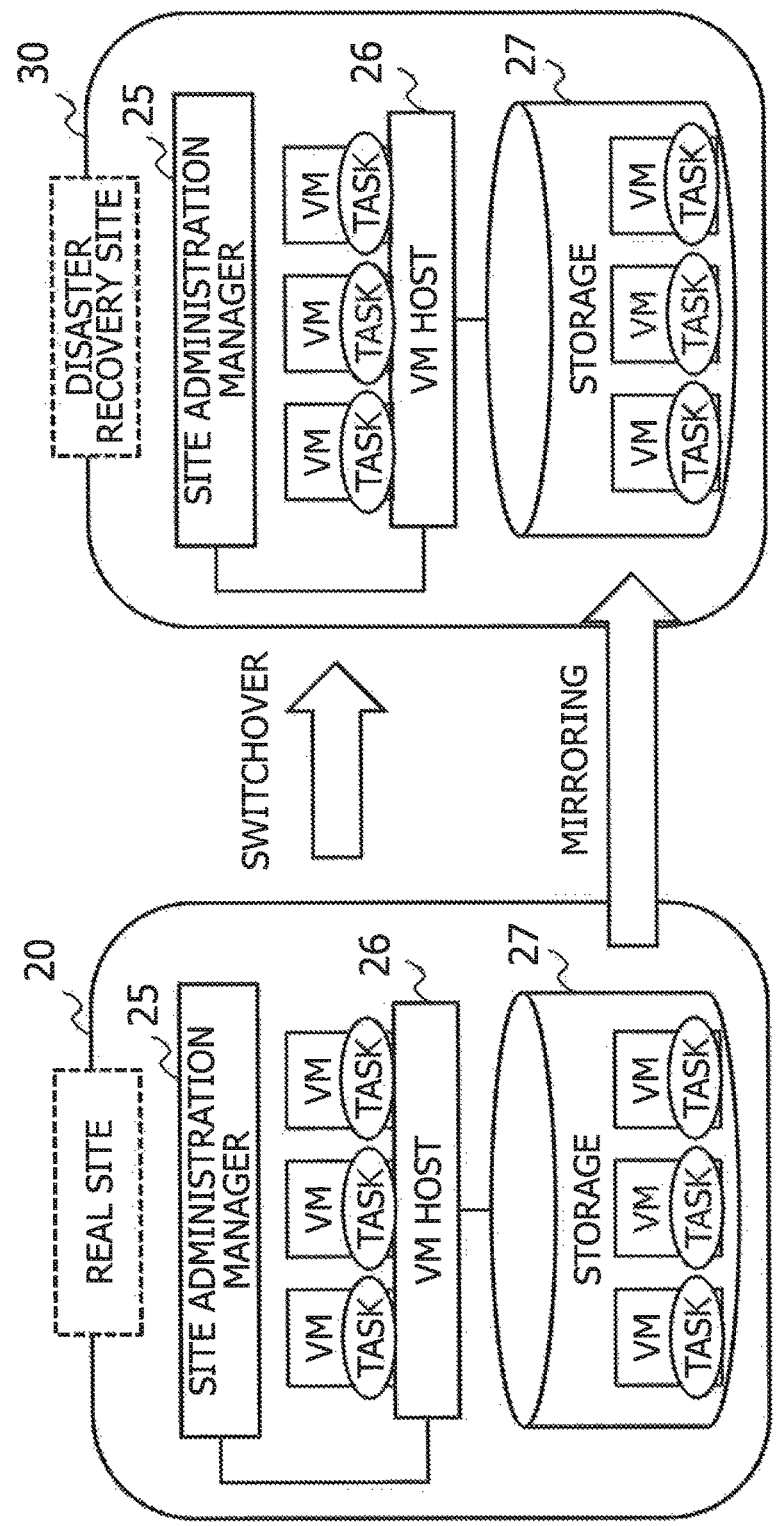
FIG. 1 is a diagram illustrating an example of a DR solution targeting on a cloud environment.

FIG. 1 is a diagram illustrating an example of the DR solution targeting on the cloud environment. In FIG. 1, a real site 20 (an active operation site is enabled by a computer (an information processing apparatus) including a site administration manager 25, a virtual machine (VM) host 26 and a storage 27. The VM host 26 operates a plurality of VMs to run the tasks. The storage 27 stores data associated with the task.

A disaster recovery site 30 is enabled by a computer (an information processing apparatus) that has the same cloud environment as the real site 20 has, and synchronizes with the real site 20 by a mirroring technique. Upon occurrences of a disaster and other equivalent situations, the real site 20 is switched over to the disaster recovery site 30. The switchover from the real site 20 to the disaster recovery site 30 is implemented based on a predefined recovery scenario. The recovery scenario provides definitions of the tasks, to be migrated to the disaster recovery site 30, of the real site 20, and definitions of the tasks to be stopped on the disaster recovery site 30. It does not, however, mean that the computers of the real site 20 and the disaster recovery site 30 are limited to virtual computers each including the VM host 26. It does not either mean that the real site 20 and the disaster recovery site 30 are restricted to the cloud environment. The real site 20 and the disaster recovery site 30 may include a plurality of information processing apparatuses.

Figure 2:
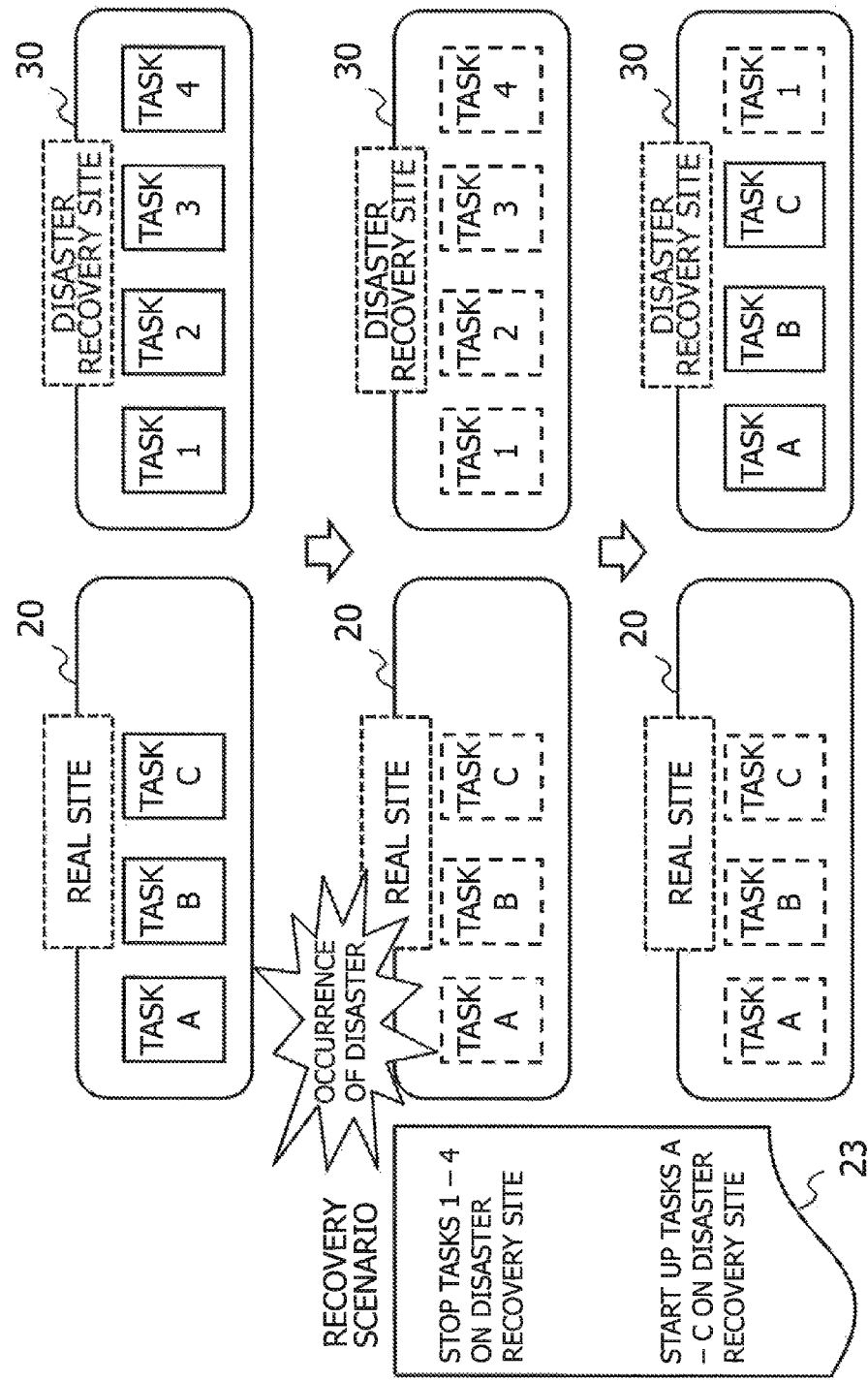
FIG. 2 is a diagram illustrating an example of executing operations defined in a recovery scenario at occurrences of a disaster and other equivalent situations.

FIG. 2 is a diagram illustrating an example of how operations defined in a recovery scenario 23 when the disaster and other equivalent situations occur, are carried out. In FIG. 2, the real site 20 runs tasks A, B and C. The disaster recovery site 30 runs tasks 1, 2, 3 and 4.

The tasks A through C of the real site 20 are stopped due to the occurrence of the disaster. The disaster recovery site 30 stops, based on the recovery scenario 23, the tasks 1 through 4. Next, the disaster recovery site 30 starts up the tasks A through C.

Note that the disaster recovery site 30 can afford to start up and the task 1 and can run the task 1 without stopping the task 1 in FIG. 2. When a resource usage quantity of each task varies, the disaster recovery site 30 redefines the recovery scenario 23, thereby enabling avoidance of a lack of resources and enabling an effective use of the resources without stopping runnable tasks.

Embodiment

When the task of the real site is stopped due to the occurrences of the disaster and other equivalent situations in the cloud environment, the stopped task is migrated to the disaster recovery site in accordance with the recovery scenario. The present embodiment involves periodically monitoring the resource usage quantities of the respective tasks running on the real site and the disaster recovery site, and dynamically redefining the recovery scenario corresponding to the resource usage quantities of the tasks and a free space of the resources on the disaster recovery site. The tasks running on the real site are one example of "first site processes". The tasks running on the disaster recovery site are one example of "second site processes".

With this configuration, the tasks are migrated based on the recovery scenario corresponding to statuses when the disaster and other equivalent situations occur even with a change of a task configuration and a variation of the resource usage quantity of each task, thereby enabling the disaster recovery site to effectively use the resources by avoiding the lack of resources.

Configuration of Apparatus

Figure 3:
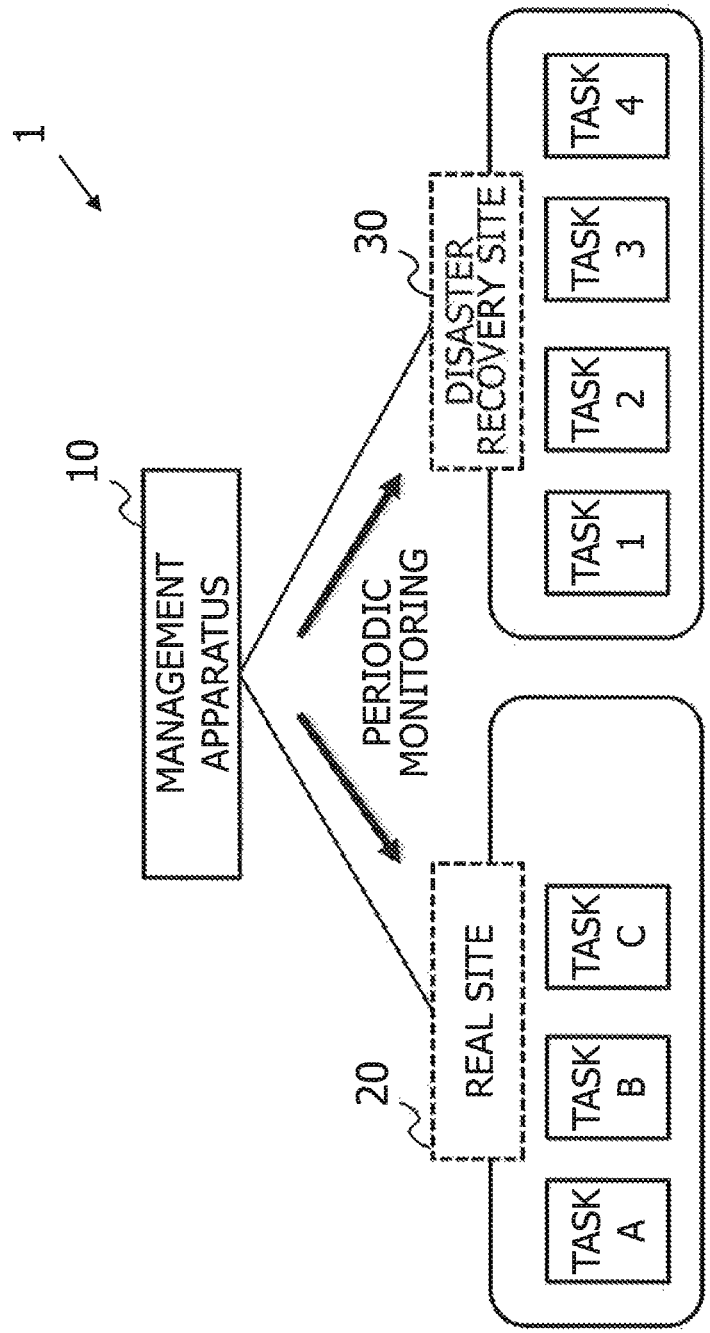
FIG. 3 is a diagram illustrating one example of an information processing system.

FIG. 3 is a diagram illustrating one example of an information processing system 1. The information processing system 1 includes the real site 20 and the disaster recovery site 30. In FIG. 3, the real site 20 runs the tasks A, B and C. The disaster recovery site 30 runs the tasks 1, 2, 3 and 4. The disaster recovery site 30, upon the occurrences of the disaster and other equivalent situations, stops a part of the tasks 1 through 4 and runs the tasks A through C.

Note that pluralities of real sites 20 and disaster recovery sites 30 may be provided without each being limited to the single site. The real site 20 is one example of a first site. The disaster recovery site 30 is one example of a second site.

Figure 4:
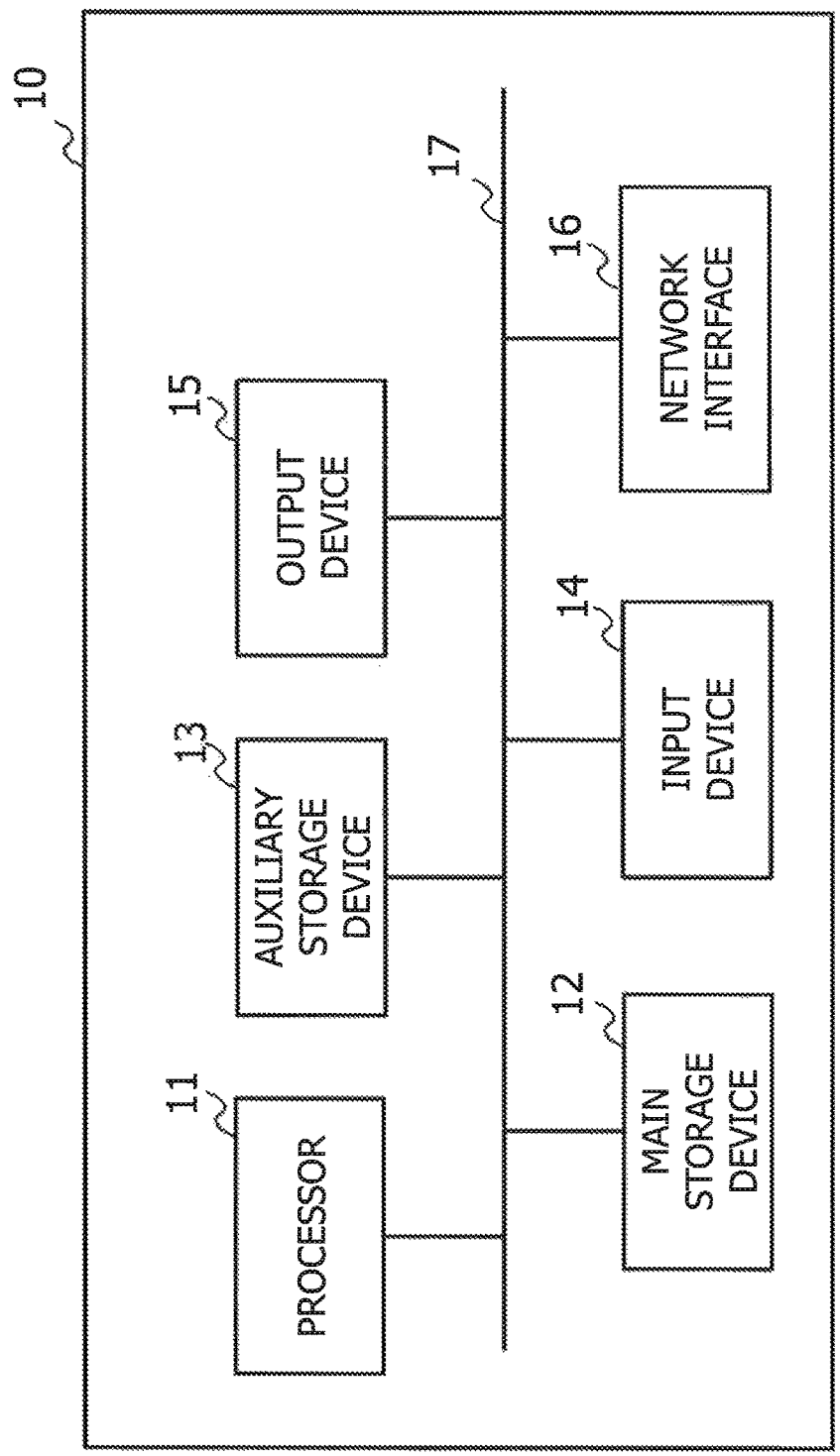
FIG. 4 is a diagram illustrating one example of a hardware configuration of a management apparatus.

FIG. 4 is a diagram illustrating one example of a hardware configuration of a management apparatus 10. The management apparatus 10 includes a processor 11, a main storage device 12, an auxiliary storage device 13, an input device 14, an output device 15 and a network interface 16. These components are interconnected via a bus 17.

The processor 11 executes a variety of processes by loading the OS and various categories of computer programs retained on the auxiliary storage device 13 into the main storage device 12, and executing these software components. However, a part of the processes based on the computer programs may be executed by a hardware circuit. The processor 11 is exemplified by a CPU (Central Processing Unit) and a DSP (Digital Signal Processor).

The main storage device 12 provides a storage area for the processor 11 to load the programs stored in the auxiliary storage device 13, and an operation area for the processor 11 to execute the programs. The main storage device 12 is used as a buffer for retaining the data. The main storage device 12 is a semiconductor memory instanced by a Read Only Memory (ROM), a Random Access Memory (RAM) and other equivalent memories.

The auxiliary storage device 13 stores the various categories of programs and the data to be used by the processor 11 when executing the respective programs. The auxiliary storage device 13 is exemplified by nonvolatile memory instanced by an Erasable Programmable ROM (EPROM) or a Hard Disk Drive (HDD) and other equivalent storages. The auxiliary storage device 13 retains, e.g., the OS (Operating System), a management program and various application programs. The auxiliary storage device 13 retains items information on usage statuses and other equivalent statuses of the real site 20 and the disaster recovery site 30, the information being collected by the management apparatus 10.

The input device 14 accepts an operation input from the user. The input device 14 is exemplified by a pointing device instanced by a touch pad, a mouse and a touch panel, a circuit to receive a signal from a keyboard, an operation button and a remote controller, and other equivalent devices. The output device 15 outputs a content of recovery scenario redefined by the management apparatus 10. The output device 15 is exemplified by an LCD (Liquid Crystal Display).

The network interface 16 is an interface for inputting and outputting the information to and from a network. The network interface 16 connects to a cable network or a wireless network. The network interface 16 is exemplified by a NIC (Network Interface Card) a wireless LAN (Local Area Network) card, and other equivalent interfaces. The data and other equivalent information received by the network interface 16 are output to the processor 11.

For example, in the management apparatus 10, the processor 11 loads a management program retained in the auxiliary storage device 13 into the main storage device 12, and executes the management program. Note that the hardware configuration of the management apparatus 10 is one example, and, without being limited to the configuration described above, components of the configuration may be properly omitted, replaced and added corresponding to the embodiment.

Figure 5:
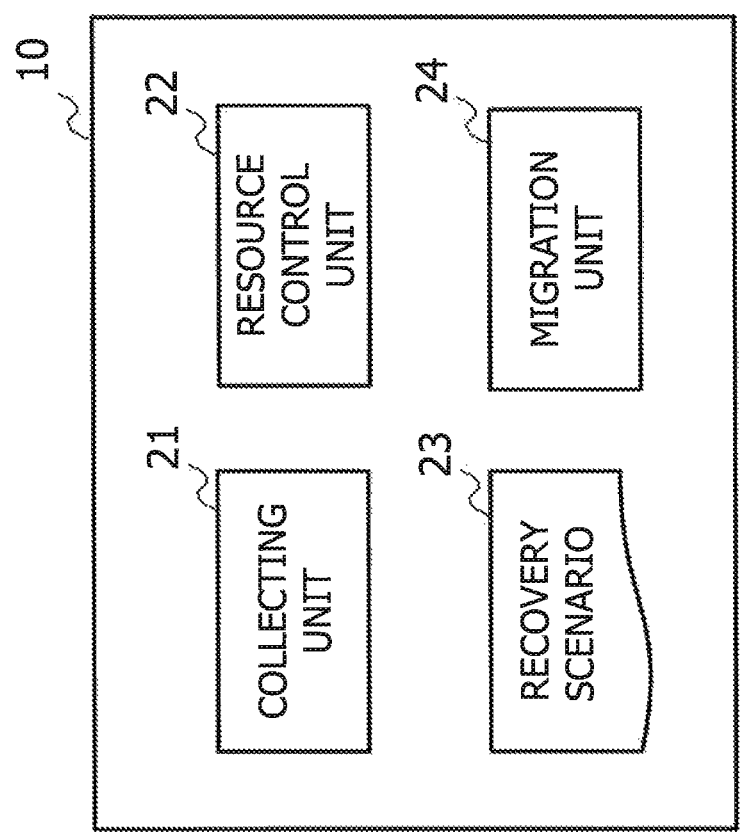
FIG. 5 is a diagram illustrating one example of a configuration of components of the management apparatus.

FIG. 5 is a diagram illustrating one example of a configuration of components of the management apparatus 10. The management apparatus 10 includes, as its components, a collecting unit 21, a resource control unit 22, a recovery scenario 23 and a migration unit 24. The processor 11 of the management apparatus 10 executes, based on the computer programs, processes of the collecting unit 21, the resource control unit 22 and migration unit 24. However, any one of the collecting unit 21, the resource control unit 22 and the migration unit 24, or a part of the processes thereof may be executed by a hardware circuit.

The collecting unit 21 collects resource usage quantities of the respective tasks running on the real site 20 and the disaster recovery site 30. The resource usage quantity is, e.g., a CPU usage quantity, a memory usage quantity, a disk Input/Output (I/O) quantity, or a network I/O quantity.

The resource control unit 22 generates the recovery scenario 23 defining the tasks, to be migrated to the disaster recovery site 30, of the real site 20, and the tasks to be stopped on the disaster recovery site 30, corresponding to the variations of the resource usage quantities of the respective tasks running on the real site 20 and the disaster recovery site 30.

The recovery scenario 23 defines the migration of the task to the disaster recovery site 30 from the real site 20, the stop of the task on the disaster recovery site 30, a reduction of the resources allocated to the tasks of the disaster recovery site 30, and other equivalent items. It may be sufficient that the recovery scenario 23 provides the definitions compiled by the computer program in a format, e.g., in a text format and a binary format of being read and executable by the processor 11. The recovery scenario 23 is one example of resource control information.

The migration unit 24 performs, based on the recovery scenario 23, stopping the task on the disaster recovery site 30, allocating the tasks to the disaster recovery site 30, reducing the resources allocated to the tasks, and other equivalent operations. The migration unit 24 migrates the tasks running on the real site 20 to the disaster recovery site 30.

Definitions of Recovery Scenario

FIGS. 6 through 12 are explanatory diagrams of the definitions of the recovery scenario 23. The management apparatus 10 collects items of management information about the resource usage status, a resource free status of the disaster recovery site 30, and other equivalent items on a task-by-task basis at a predetermined time interval. The management apparatus 10 makes definitions of the recovery scenario 23, based on predetermined index values acquired from the collected items of management information. FIGS. 6 and 7 illustrate the items of management information to be collected and the index values. FIGS. 8 through 12 depict examples of the recovery scenarios 23 corresponding to the index values.

For collecting the items of management information used for the definitions of the recovery scenario 23, a user designates a type of monitoring target resource and a monitoring interval. The type of monitoring target resource is instanced by the CPU, the memory, the disk, the network, and other equivalent resources. The monitoring interval is a time interval at which to collect the items of management information used for the management apparatus 10 to make the definitions of the recovery scenario 23. The management apparatus 10 collects the resource usage statuses of the tasks, the free statuses of the resources of the disaster recovery site 30, and other equivalent items of information per time designated as the monitoring interval.

FIG. 6 is the diagram illustrating an example of management information 40 to be collected by the management apparatus 10. In FIG. 6, items of "task" represent names of the tasks running on the real site 20 and the disaster recovery site 30. Information of "site" and information of "most updated state" are retained by being associated with each "task". The information of "site" indicates whether the task runs on the real site 20 or the disaster recovery site 30. The information of "most updated state" indicates whether the task is started up.

In the example of FIG. 6, pieces of information about the CPU usage quantities at respective points of time, i.e., "2014/08/08/00:20", "2014/08/08/06:20" and "2014/08/08/12:20" are retained by being associated with each "task". The management apparatus 10 periodically monitors the resource usage quantities, and keeps retaining the resource usage quantities of the tasks at a time when collecting the information (which will hereinafter be also termed the information collecting time).

To be specific, the "task A" is a task of the real site 20 and is in the startup state. The CPU usage quantities of the "task A" are 2 GHz at "2014/08/08/00:20", 1 GHz at "2014/08/08/06:20", and 3 GHz at "2014/08/08/12:20".

The free spaces of the disaster recovery site 30 are also collected and retained in addition to the resource usage quantities of the tasks. To be specific, the free spaces of the disaster recovery site 30 are 5 GHz at "2014/08/08/00:20", 5 GHz at "2014/08/08/06:20", and 3 GHz at "2014/08/08/12:20".

FIG. 7 is the diagram illustrating an example of determining whether the recovery scenario is redefined. The management apparatus 10 determines whether the "redefinitions of recovery scenario" made based on a "CPU free space of disaster recovery site", a "CPU usage quantity of real site" and an "index value X".

The "CPU free space of disaster recovery site" is a CPU free space of the disaster recovery site 30 at every information collecting time. The "CPU usage quantity of real site" is a total of the CPU usage quantities usable by the tasks on the real site 20 at the respective information collecting times.

The "index value X" is a value given by a calculation "A÷B", where A is the "CPU free space of disaster recovery site", and B is the "CPU usage quantity of real site". Note that the "index value X" may be, if being a value representing a ratio of A to B, calculated by other calculation formulae.

"Redefinition of recovery scenario" indicates whether the recovery scenario 23 is redefined. When the "CPU free space of disaster recovery site" is larger than the "CPU usage quantity of real site", the recovery scenario 23 may not be redefined. The management apparatus 10 does not redefine the recovery scenario 23 when the "index value X" is equal to or larger than e.g., "1" but redefines the recovery scenario 23 when the "index value X" is smaller than "1".

To be specific, the "CPU free space of disaster recovery site" at "2014/08/08/00:20" is 5 GHz, and the "CPU usage quantity of real site" at "2014/08/08/00:20" is 4 GHz. The "index value X" is calculated by 5÷4=1.25. The "index value X" is equal to or larger than "1" and hence the recovery scenario 23 is not redefined.

The "CPU free space of disaster recovery site" at "2014/08/08/12:20" is 3 GHz, and the "CPU usage quantity of real site" at "2014/08/08/12:20" is 7 GHz. The "index value X" is calculated by 3÷7 which is about 0.43. The recovery scenario 23 is redefined because of the "index value X" being smaller than "1" and the disaster recovery site 30 lacking in free space.

It is checked whether the redefinition of the recovery scenario 23 is made also at the occurrences of the disaster and other equivalent situations. FIG. 7 illustrates an example of the disaster occurring at "2014/08/08/12:41". When the disaster occurs, the "CPU free space of disaster recovery site" is 1 GHz, and the "CPU usage quantity of real site" is 7 GHz. The "index value X" is calculated by 1÷7 which is about 0.14. The "index value X" varies from the value given at the last information collecting time, i.e., "2014/08/08/12:20", and the recovery scenario 23 is therefore redefined.

FIGS. 8 through 12 depict examples of the recovery scenario 23 corresponding to the index values. The present embodiment involves redefining the recovery scenario 23 in separation into cases 1-5 corresponding to the index values X. FIGS. 8 through 12 correspond to the cases 1-5, respectively.

Note that the recovery scenario 23 may be redefined in separation into cases depending on arbitrary conditions without being limited to the cases 1-5. In the separation into the cases, the process of ensuring the free space of the disaster recovery site 30 may include properly combining processes conducted in the cases 1-5.

The cases 1-5 are described on the assumption that the resource is the CPU usage quantity, and the resource may, however, be the memory usage quantity, the disk I/O quantity, the network I/O quantity, or other equivalent quantities.

Case 1

The case 1 is a case that the disaster recovery site 30 has an allowance in free space. In this instance, e.g., the index value X satisfies a relation "0.6≤X<1". It may be sufficient that a threshold value of the index value X is, without being limited to "0.6", such a value that the disaster recovery site 30 is deemed to have the allowance in free space.

The disaster recovery site 30 has the allowance in free space, and hence deficient resources are shared and charged among the respective tasks of the disaster recovery site 30. Concretely, the deficient resources are supplied from the respective tasks of the disaster recovery site 30, corresponding to resource usage rates.

Figure 8:
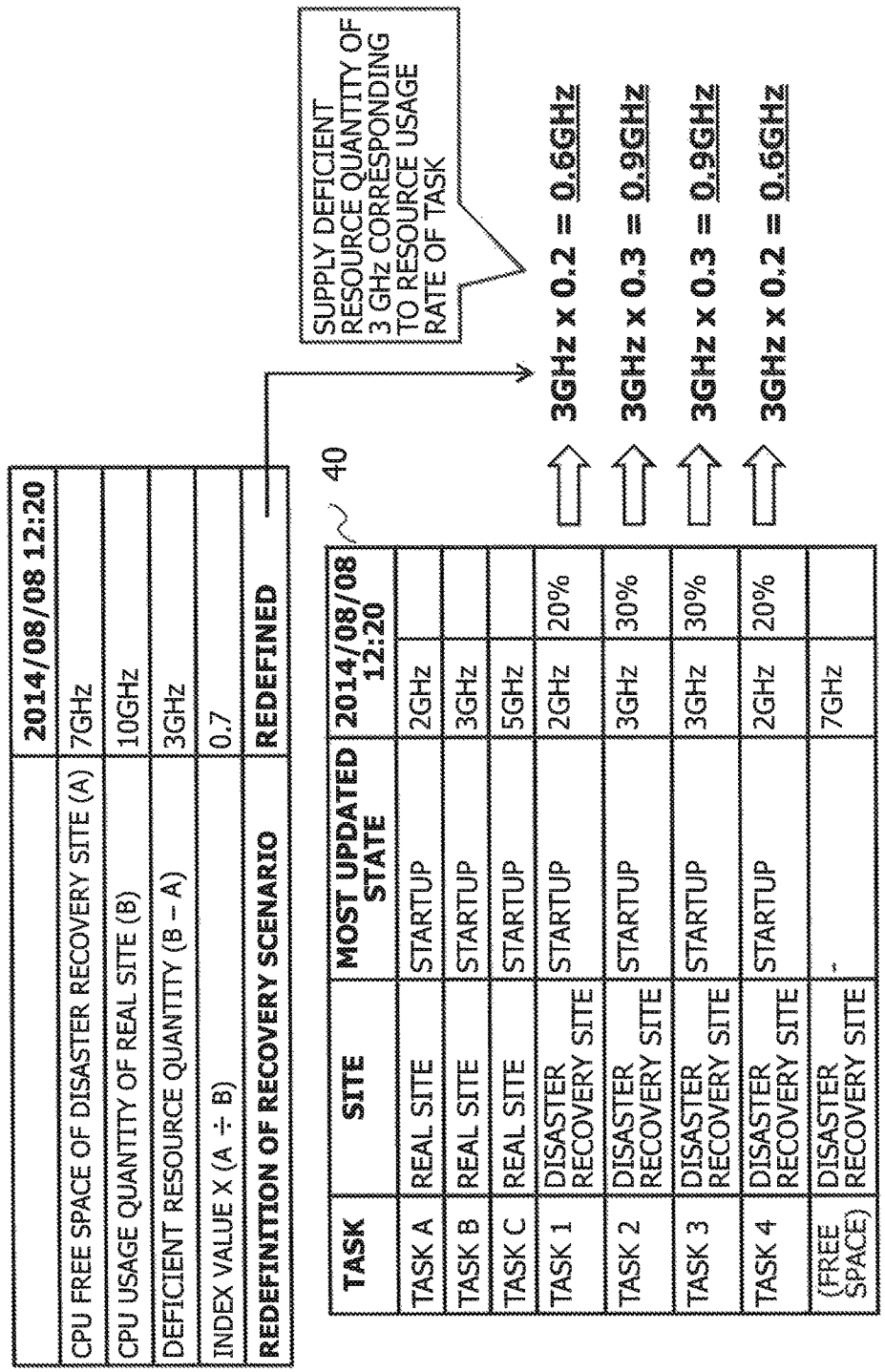
FIG. 8 is a diagram illustrating an example supplying deficient resources from respective tasks when the disaster recovery site has an allowance in free space.

FIG. 8 is the diagram illustrating an example that the deficient resources are supplied from the tasks when the disaster recovery site has the allowance in free space. It is determined based on the management information 40 collected by the management apparatus 10 whether the recovery scenario 23 is redefined. In FIG. 8, at "2014/08/08/12:20", the "CPU free space of disaster recovery site" is 7 GHz, the "CPU usage quantity of real site" is 10 GHz, and a "deficient resource quantity" is 3 GHz. The "index value X" is calculated by 7÷10=0.7. The "index value X" is smaller than "1", and the recovery scenario 23 is therefore redefined.

The tasks 1-4 run in progress on the disaster recovery site 30. The resource usage quantities of the tasks 1-4 are 2 GHz, 3 GHz, 3 GHz and 2 GHz respectively, and the resource usage quantity of the disaster recovery site 30 becomes 10 GHz. The resource usage rates of the tasks 1-4 to the resource usage quantity, i.e., "10 GHz" of the disaster recovery site 30 are 20%, 30%, 30% and 20%, respectively.

The deficient resource, i.e., 3 GHz is supplied corresponding to the resource usage rates of the tasks. The task 1 supplies 0.6 GHz obtained by multiplying 3 GHz i.e., the deficient resource by 0.2, i.e., the resource usage rate of the task 1. The task 2 supplies 0.9 GHz obtained by multiplying 3 GHz of the deficient resource by 0.3 of the resource usage rate of the task 2. The task 3 supplies 0.9 GHz obtained by multiplying 3 GHz of the deficient resource by 0.3 of the resource usage rate of the task 3. The task 4 supplies 0.6 GHz obtained by multiplying 3 GHz of the deficient resource by 0.2 of the resource usage rate of the task 4.

The free space of the disaster recovery site 30 is increased by 3 GHz to reach 10 GHz owing to the resource being supplied from each task. The index value X is calculated by 10÷10=1 and is therefore equal to or larger than "1", resulting in termination of the recovery scenario 23.

Case 2

The case 2 is a case that the disaster recovery site 30 has the allowance in free space. In this instance, e.g., the index value X satisfies the relation "0.6≤X<1". It may be sufficient that the threshold value of the index value X is, without being limited to "0.6", such a value that the disaster recovery site 30 is deemed to have the allowance in free space.

The case 2 is also a case that when the resource is supplied from each task of the disaster recovery site 30 as in the case 1, a post-supplying resource usage quantity of any one of the tasks decreases below a predetermined reference level. In this instance, the task having a higher resource usage rate than other tasks is stopped. Note that the predetermined reference level is a resource quantity used for continuing the task and is also a value predefined on the task-by-task basis.

FIG. 9 is the diagram illustrating an example of stopping the task having the higher resource usage rate than other tasks when the disaster recovery site has the allowance in free space. In FIG. 9, similarly to the case 1, the "index value X" is smaller than "1", and hence the recovery scenario 23 is redefined.

The tasks 1-4 run in progress on the disaster recovery site 30. The resource usage quantities of the tasks 1-4 are 1 GHz, 4 GHz, 3 GHz and 2 GHz respectively, and the resource usage quantity of the disaster recovery site 30 becomes 10 GHz. The resource usage rates of the tasks 1-4 to the resource usage quantity, i.e., "10 GHz" of the disaster recovery site 30 are 10%, 40%, 30% and 20%, respectively.

When the deficient resource is supplied from each task, it follows that the task 1 supplies 0.3 GHz obtained by multiplying the deficient resource "3 GHz" by the resource usage rate "0.1" of the task 1. The post-supplying resource usage quantity is to be 0.7 GHz and is assumed to be below the predetermined reference level. In this instance, the task 2 having the higher resource usage rate than other tasks is stopped without supplying the deficient resource from each task.

The free space of the disaster recovery site 30 is increased by 4 GHz to reach 11 GHz due to the stop of the task 2. The index value X is calculated by 11÷10=1.1 and is therefore equal to or larger than "1", resulting in termination of the recovery scenario 23.

Case 3

The case 3 is a case that the disaster recovery site 30 has no allowance in free space. In this instance, e.g., the index value X satisfies the relation "0.2≤X<0.6". It may be sufficient that the threshold value of the index value X is, without being limited to "0.2" and "0.6", such a value that the disaster recovery site 30 is deemed to have no allowance in free space.

The disaster recovery site 20 has no allowance in free space, and hence the task having a relatively high resource usage rate in the tasks of the disaster recovery site 30 is stopped. For example, the task having the resource usage rate, which is equal to or larger than 40%, is stopped. The stop of the task having the relatively high resource usage rate enables other tasks of the disaster recovery site 30 to continue running without being affected.

The index value X does not become equal to or larger than "1" even by stopping the task having the relatively high resource usage rate, in which case it may be sufficient that the tasks of the disaster recovery site 30 supply the deficient resources corresponding to the resource usage rates.

FIG. 10 is a diagram illustrating an example of stopping the task having the higher resource usage rate than the predetermined threshold value when the disaster recovery site has no allowance in free space. It is determined used on the management information 40 collected by the management apparatus 10 whether the recovery scenario 23 is redefined. In FIG. 10, at "2014/08/08/12:20", the "CPU free space of disaster recovery site" is 3 GHz, the "CPU usage quantity of real site" is 7 GHz, and the "deficient resource quantity" is 4 GHz. The "index value X" is calculated by 3÷7 which is about 0.43. The "index value X" is smaller than "1", and hence the recovery scenario 23 is redefined.

The tasks 1-4 run in progress on the disaster recovery site 30. The resource usage quantities of the tasks 1-4 are 3 GHz, 8 GHz, 3 GHz and 2 GHz respectively, and the resource usage quantity of the disaster recovery site 30 becomes 16 GHz. The resource usage rates of the tasks 1-4 to the resource usage quantity "16 GHz" of the disaster recovery site 30 are 19%, 50%, 19% and 12%, respectively.

The task having the resource usage rate, which is 50% higher than other tasks, is stopped. The free space of the disaster recovery site 30 is increased by 8 GHz to reach 11 GHz due to the stop of the task 2. The "index value X" is calculated by 11÷7 which is about 1.57. The index value X is equal to or larger than "1", and the recovery scenario 23 is terminated.

Case 4

The case 4 is a case that the disaster recovery site 30 has no allowance in free space. For instance, this is a case that the index value X satisfies a relation "0.2≤X<0.6". It may be sufficient that the threshold value of the index value X is, without being limited to "0.2" and "0.6", such a value that the disaster recovery site 30 is deemed to have no allowance in free space.

The case 4 unlike the case 3 is a case of having no task with the resource usage rate being relatively high. In this instance, the deficient resources are supplied from the respective tasks of the disaster recovery site 30, corresponding to the resource usage rates.

When the resource is supplied from each task of the disaster recovery site 30 and when the post supplying resource usage quantity decreases below the predetermined reference level in any one of the tasks, it may be sufficient to stop the task having the higher resource usage rate than other tasks. Note that the predetermined reference level is a value predefined on the task-by-task basis.

When the index value X is smaller than "1" owing to even the supply of the resource from each task or the stop of the task, the supply of the resource from each task or the stop of the task is repeated till the index value X becomes equal to or larger than "1".

Figure 11:
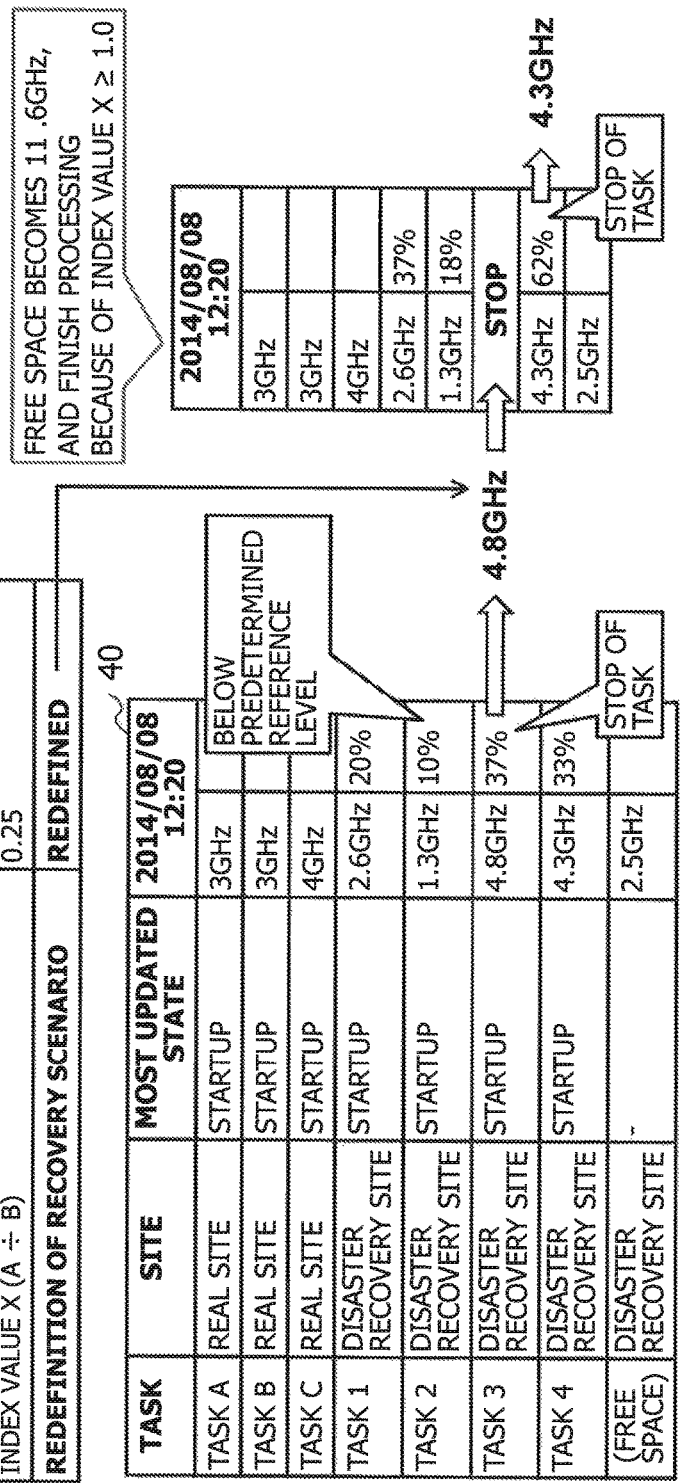
FIG. 11 is a diagram illustrating an example of stopping the task having the higher resource usage rate than other tasks when the disaster recovery site has no allowance in free space.

FIG. 11 is a diagram illustrating an example of stopping the task having the higher resource usage rate than other tasks when the disaster recovery site has not allowance in free space. It is determined based on the management information 40 collected by the management apparatus 10 whether the recovery scenario 23 is redefined. In FIG. 11, at "2014/08/08/12:20", the "CPU free space of disaster recovery site" is 2.5 GHz, the "CPU usage quantity of real site" is 10 GHz, and the "deficient resource quantity" is 7.5 GHz. The "index value X" is calculated by 2.5÷10=0.25. The "index value X" is smaller than "1", and hence the recovery scenario 23 is redefined.

The tasks 1-4 run in progress on the disaster recovery site 30. The resource usage quantities of the tasks 1-4 are 2.6 GHz, 1.3 GHz, 4.8 GHz and 4.3 GHz respectively, and the resource usage quantity of the disaster recovery site 30 becomes 13 GHz. The resource usage rates of the tasks 1-4 to the resource usage quantity "13 GHz" of the disaster recovery site 30 are approximately 20%, 10%, 37% and 33%, respectively.

When the deficient resource is supplied from each task, it follows that the task 2 supplies 0.75 GHz obtained by multiplying the deficient resource "7.5 GHz" by the resource usage rate "0.1" of the task 2. The post-supplying resource usage quantity is to be 0.55 GHz and is assumed to be below the predetermined reference level. In this instance, the task 3 having the higher resource usage rate than other tasks is stopped without supplying the deficient resource from each task.

The free space of the disaster recovery site 30 is increased by 4.8 GHz to reach 7.3 GHz due to the stop of the task 3. The index value X is calculated by 7.3÷10=0.73. The index value X is smaller than "1", and hence the further deficient resources are supplied from the individual tasks.

The tasks 1, 2 and 4 run in progress on the disaster recovery site 30. The resource usage quantities of the tasks 1, 2 and 4 are 2.6 GHz, 1.3 GHz and 4.3 GHz respectively, and the resource usage quantity of the disaster recovery site 30 becomes 8.2 GHz. The resource usage rates of the tasks 1, 2 and 4 to the resource usage quantity "8.2 GHz" of the disaster recovery site 30 are approximately 37%, 18% and 62%, respectively. The deficient resource is given by 10−8.2=1.8 GHz.

When deficient resource is supplied from each task, it follows that the task 2 supplies about 0.3 GHz obtained by multiplying the deficient resource "1.8 GHz" by the resource usage rate "0.18". The post-supplying resource usage quantity is to be 1.0 GHz and is assumed to be below the predetermined reference level. In this instance, the operation is not that the deficient resources are supplied from the respective tasks but that the task 4 having the higher resource usage rate than other tasks is stopped.

The free space of the disaster recovery site 30 is increased by 4.3 GHz to reach 11.6 GHz due to the stop of the task 4. The index value X is calculated by 11.6÷10=1.16, and the index value X is equal to or larger than "1", resulting in the termination of the recovery scenario 23.

Case 5

The case is a case that the disaster recovery site 30 has almost no allowance in free space. For example, this is a case that the index value X satisfies a relation "X<0.2". It may be sufficient that the threshold value of the index value X is, without being limited to "0.2", such a value that the disaster recovery site 30 is deemed to have almost no allowance in free space. The disaster recovery site 30 has almost no allowance in free space, and each tasks of the disaster recovery site 30 are therefore stopped.

FIG. 12 is a diagram illustrating an example of stopping every task of the disaster recovery site when the disaster recovery site 30 has almost no allowance in free space. It is determined based on the management information 40 collected by the management apparatus 10 whether the recovery scenario 23 is redefined. In FIG. 12, at "2014/08/08/12:20", the "CPU free space of disaster recovery site" is 1 GHz, the "CPU usage quantity of real site" is 13 GHz, and the "deficient resource quantity" is 12 GHz. The "index value X" is calculated by 1÷13 which is about 0.08. The "index value X" is smaller than "1", and hence the recovery scenario 23 is redefined.

The disaster recovery site 30 has almost no allowance in free space, and hence the respective tasks running in progress on the disaster recovery site 30 are stopped. The free space of the disaster recovery site 30 is increased by 12 GHz to reach 13 GHz due to the stop of each task. The index value X is calculated by 13÷13=1. The index value X is equal to or larger than "1", and the recovery scenario 23 is therefore terminated.

Processing Flow

Figure 13:
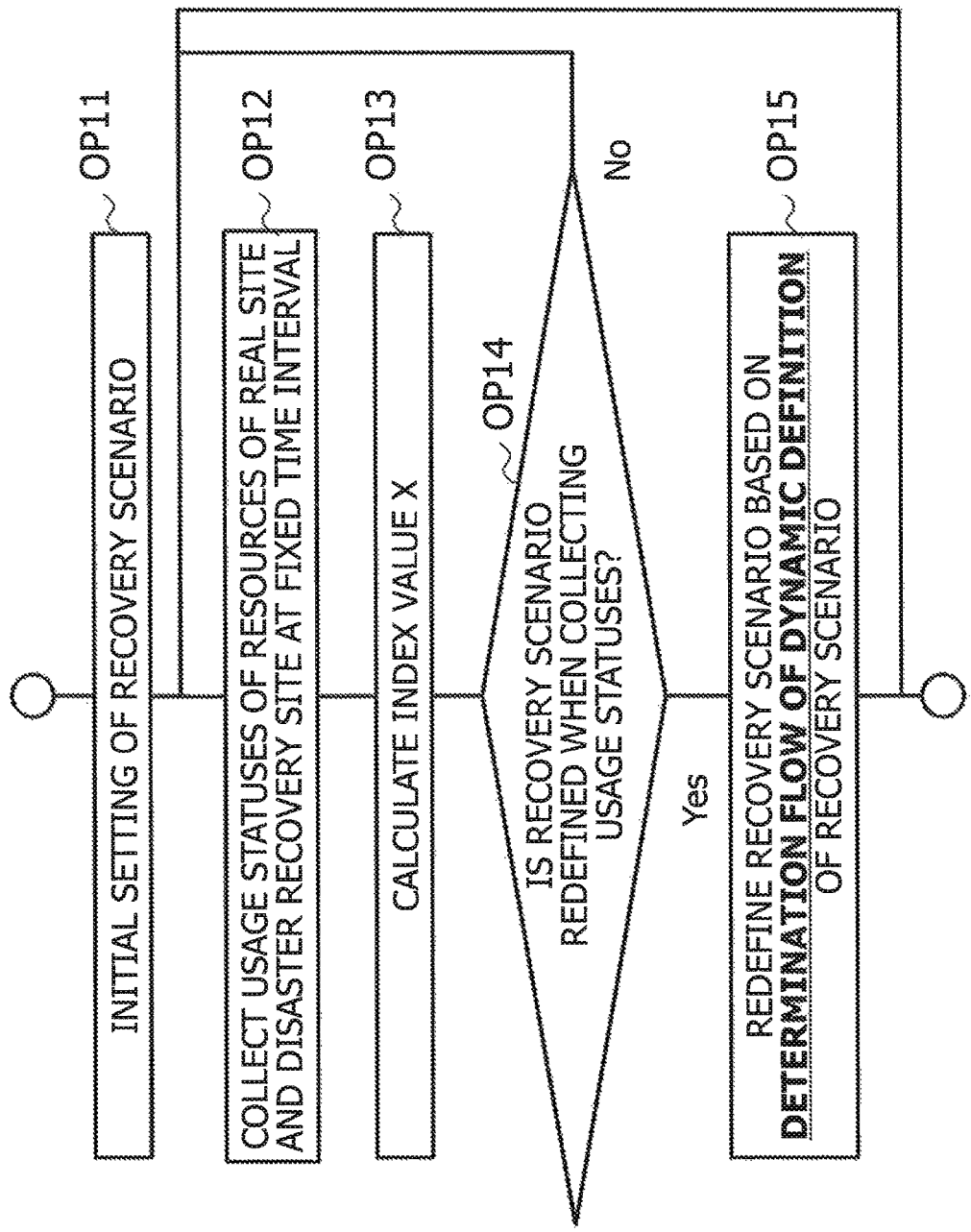
FIG. 13 is a diagram of one example of a flowchart of a process of redefining the recovery scenario when in a normal operation.
Figure 14:
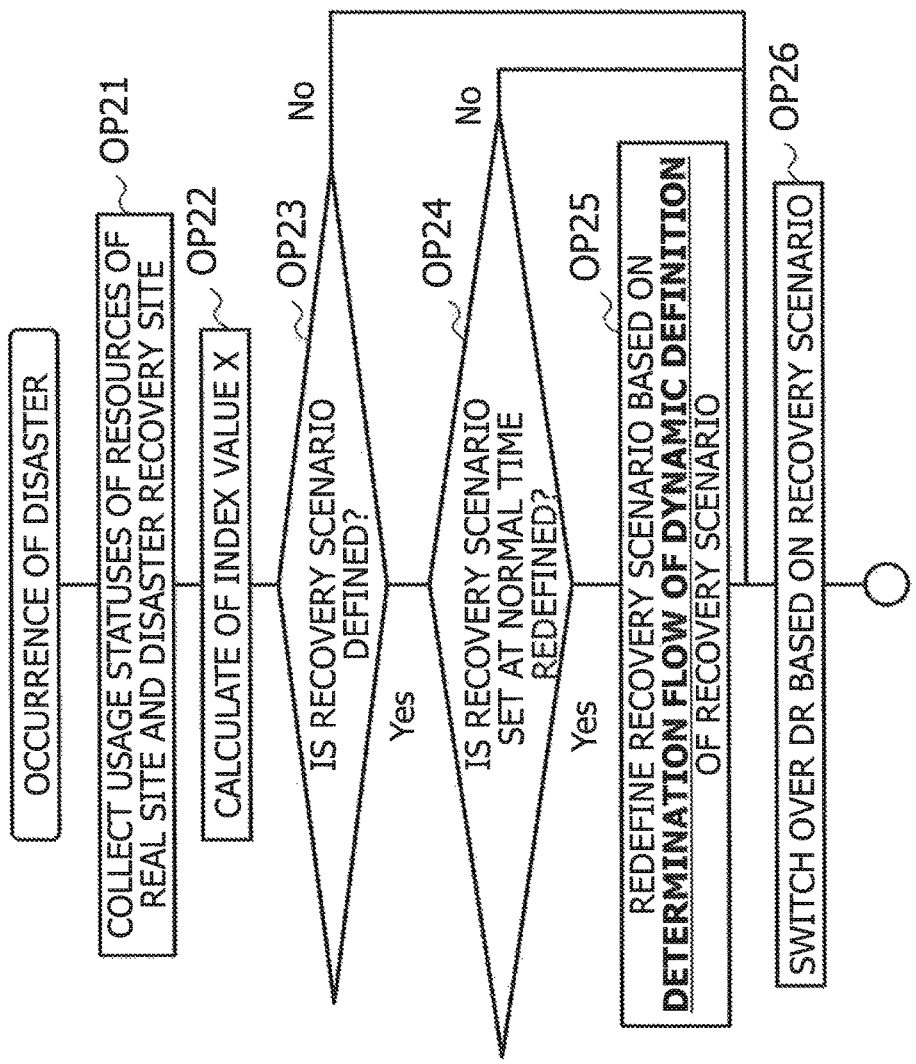
FIG. 14 is a diagram of one example of a flowchart of a process of performing a switchover of the site in accordance with the recovery scenario at the occurrence of the disaster.
Figure 15:
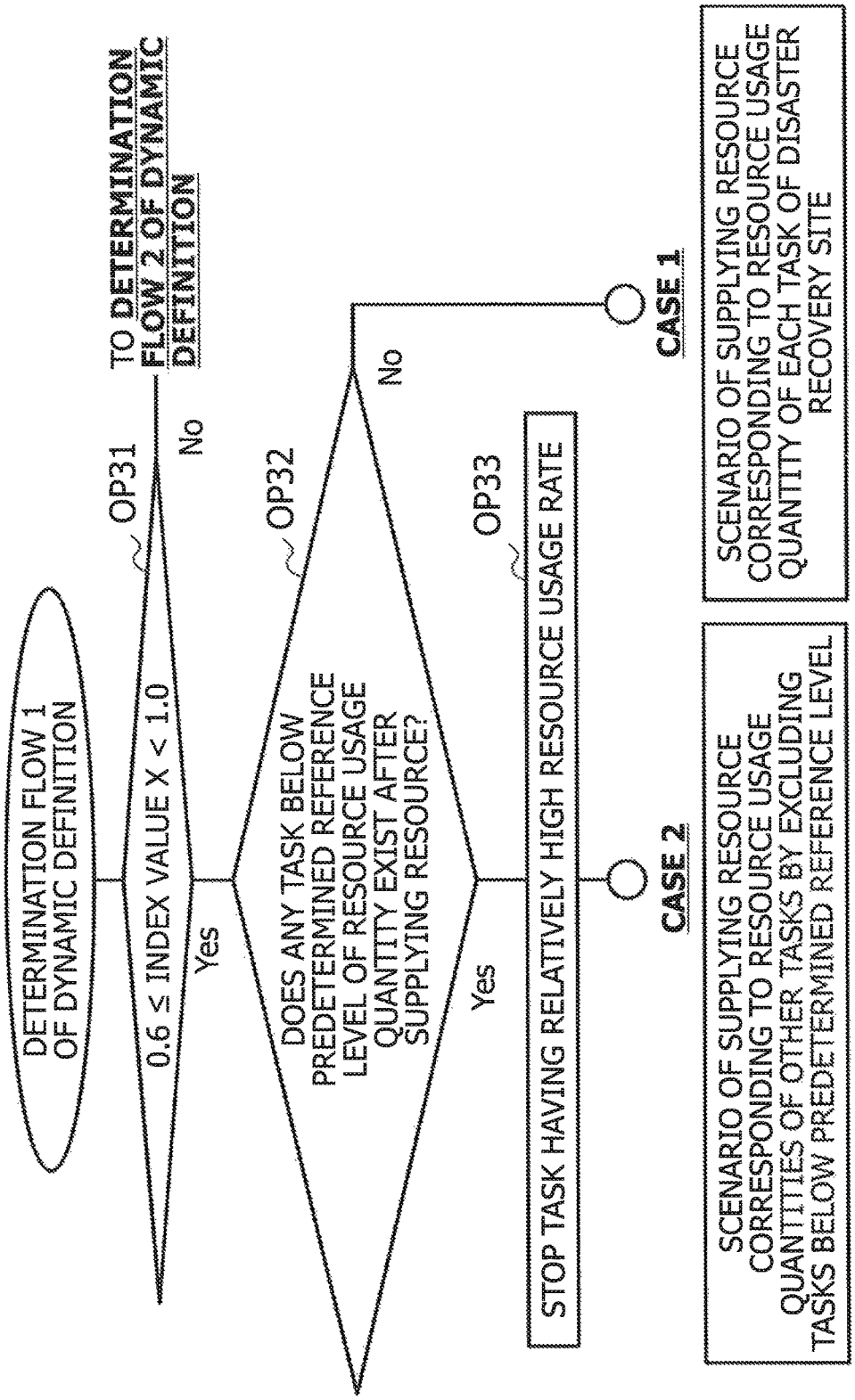
FIG. 15 is a diagram of one example of a determination flow of a dynamic definition of the recovery scenario when the disaster recovery site has the allowance in free space.
Figure 16:
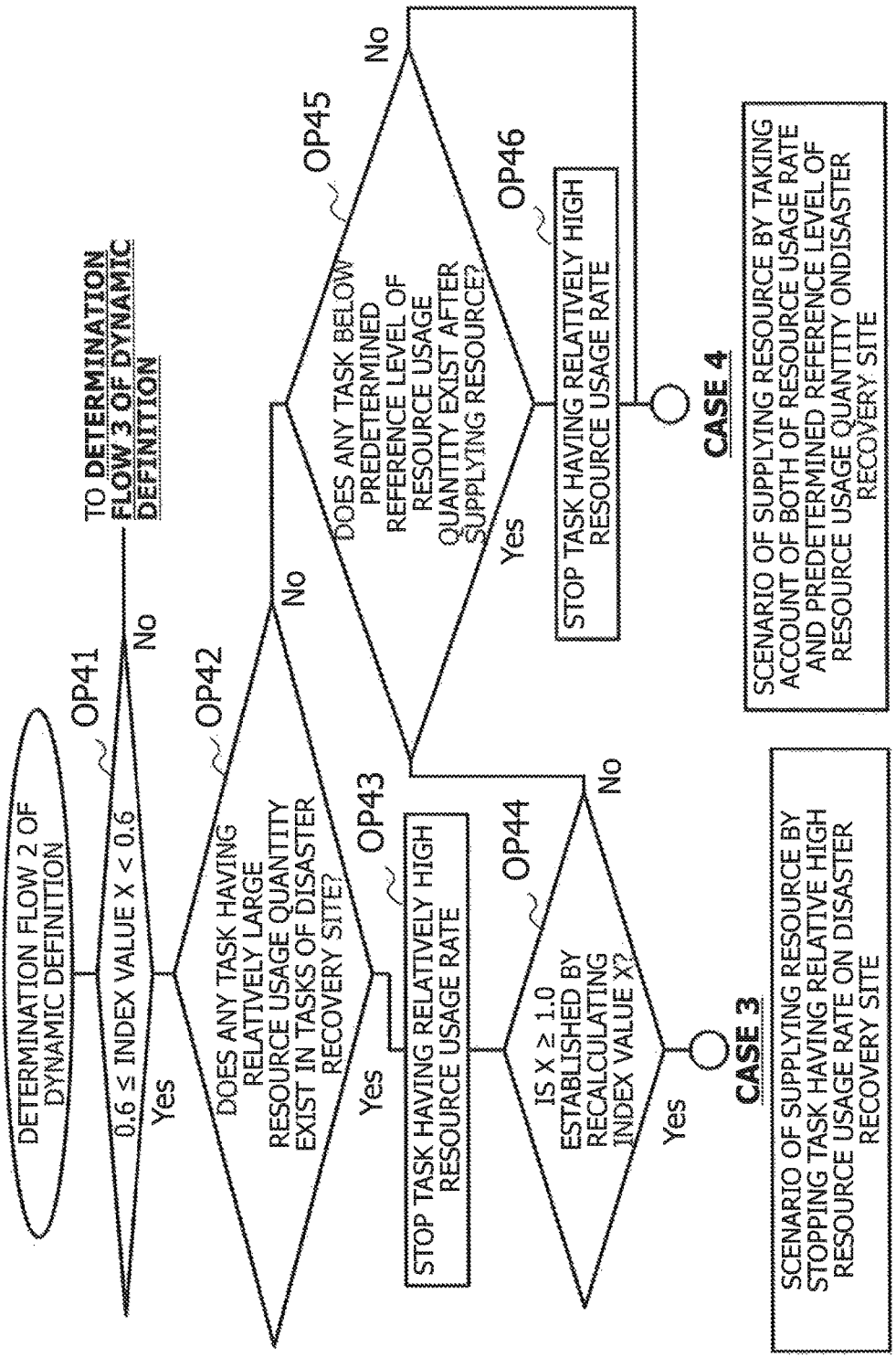
FIG. 16 is a diagram of one example of a determination flow of the dynamic definition of the recovery scenario when the disaster recovery site has no allowance in free space.
Figure 17:
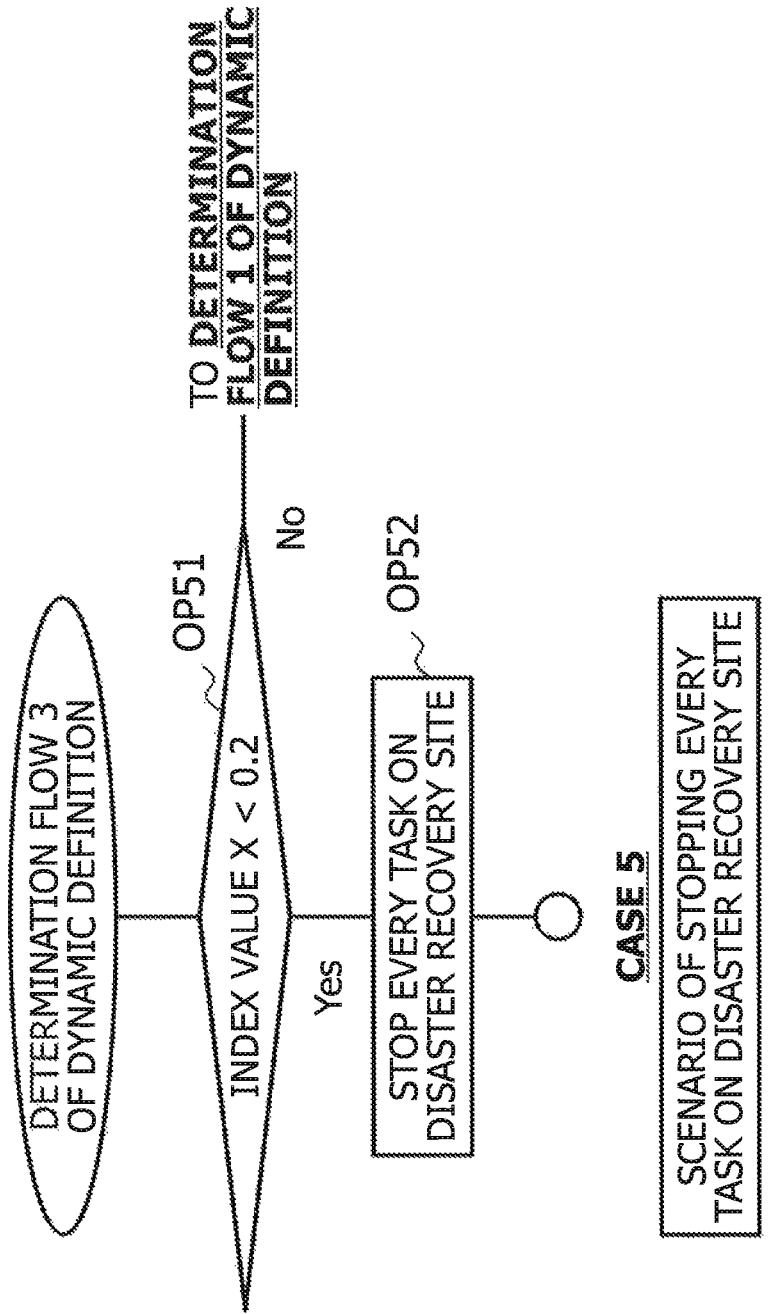
FIG. 17 is a diagram of one example of a determination flow of the dynamic definition of the recovery scenario when the disaster recovery site has almost no allowance in free space.

FIGS. 13 and 14 are explanatory flowcharts each depicting a processing flow of redefining and implementing the recovery scenario 23. FIGS. 15 through 17 are explanatory flowcharts each illustrating details of a determination flow of a dynamic definition of the recovery scenario 23.

FIG. 13 is one example of the flowchart of a process of redefining the recovery scenario when in a normal operation. A start of the process of redefining the recovery scenario when in the normal operation is triggered by starting up, e.g., the management apparatus 10.

In OP11, the management apparatus 10 performs initial settings of the recovery scenario 23. The initial settings include setting, e.g., the types of the monitoring target resources and the monitoring interval. Next, the processing advances to OP12. In OP12, the management apparatus 10 collects resource usage statuses of the disaster recovery site 30 at a fixed time interval. Subsequently, the processing advances to OP13.

In OP13, the management apparatus 10 calculates the index value X. Next, the processing advances to OP14. In OP14, the management apparatus 10 determines whether or not the recovery scenario 23 is redefined just when collecting the usage statuses. When the recovery scenario 23 is redefined, i.e., when a relation of the index value X<1 is established (OP14: Yes), the processing advances to OP15. Whereas when the recovery scenario 23 is not redefined, i.e., when a relation of the index value X≥1 is established (OP14: No), the processing loops back to OP12.

In OP15, the management apparatus 10 redefines the recovery scenario 23 in accordance with the determination flow of the dynamic definition of the recovery scenario 23 illustrated in FIGS. 15 through 17. Next, the processing loops back to OP12. The management apparatus 10 is kept active, during which the processes in OP12 through OP15 are iterated.

FIG. 14 is one example of the flowchart of a process of performing the switchover of the site in accordance with the recovery scenario at the occurrence of the disaster. A start of the process of performing the switchover of the site in accordance with the recovery scenario at the occurrence of the disaster is triggered by, e.g., an event that the management apparatus 10 detects the occurrences of the disaster and other equivalent situations. The occurrences of the disaster and other equivalent situations are detected by, e.g., a failure of communication with the real site 20, an input of the operator and other equivalent factors.

In OP21, the management apparatus 10 collects the resource usage statuses of the real site 20 and the disaster recovery site 30. Next, the processing advances to OP22. In OP22, the management apparatus 10 calculates the index value X. Subsequently, the processing advances to OP23.

In OP21, the management apparatus 10 determines whether the recovery scenario 23 is redefined. When the recovery scenario 23 is redefined, i.e., when the relation of the index value X<1 is established (OP23: Yes), the processing advances to OP24. Whereas when the recovery scenario 23 is not redefined, i.e., when the relation of the index value X≥1 is established (OP23: No), the processing diverts to OP26.

In OP24, the management apparatus 10 determines whether the recovery scenario 23 set at a normal time is redefined. To be specific, the management apparatus 10 determines whether the index value X calculated at the occurrence of the disaster deviates from a range of the index value X for the recovery scenario 23 set at the normal time.

When the recovery scenario 23 is redefined, i.e., when the index value X calculated at the occurrence of the disaster deviates from the range of the index value X for the recovery scenario 23 set at the normal time (OP24: Yes) the processing advances to OP25. Whereas when the recovery scenario 23 is not redefined, i.e., when the index value X calculated at the occurrence of the disaster falls within the range of the index value X for the recovery scenario 23 set at the normal time (OP24: No), the processing diverts to OP26.

In OP21, the management apparatus 10 redefines the recovery scenario 23 in accordance with the determination flow of the dynamic definition of the recovery scenario 23 as illustrated in FIGS. 15 through 17. Next, the processing advances to OP26. In OP26, the management apparatus 10 switches over the tasks of the real site 20 to the disaster recovery site 30 according to the recovery scenario 23, and the processing comes to an end.

FIGS. 15 through 17 are explanatory diagrams illustrating details of the determination flow of the dynamic definition of the recovery scenario 23. Processes in FIGS. 15 through 17 are details of OP15 in FIG. 13 and OP25 in FIG. 14, and are referred to as a determination flow 1 of the dynamic definition, a determination flow 2 of the dynamic definition and a determination flow 3 of the dynamic definition, respectively.

FIG. 15 illustrates one example of the determination flow of the dynamic definition of the recovery scenario 23 when the disaster recovery site has the allowance in free space. In simpler terms, FIG. 15 illustrates a flow of the recovery scenario 23 in the case 1 and the case 2.

In OP31, the management apparatus 10 determines whether the index value X satisfies a relation of 0.6≤index value X<1.0. When satisfying 0.6≤index value X<1.0 (OP31: Yes), the processing advances to OP32. Whereas when not satisfying 0.6≤index value X<1.0 (OP31: No), the processing moves to the determination flow 2 of the dynamic definition.

In OP32, the management apparatus 10 determines, after supplying the resources, whether there exists the task with the resource usage quantity being below the predetermined reference level. When there exists the task with the resource usage quantity being below the predetermined reference level (OP32 Yes), the processing advances to OP33. Whereas when there does not exist the task with the resource usage quantity being below the predetermined reference level (OP32: No), the recovery scenario 23 in the case 1 defined, resulting in termination of the processing. The recovery scenario 23 in the case 1 is a scenario of supplying the resources, corresponding to the resource usage quantities of the tasks of the disaster recovery site.

In OP33, the management apparatus 10 stops the task having the relatively high resource usage rate. The recovery scenario 23 in the case 2 is defined, and the processing comes to an end. The recovery scenario 23 in the case 2 is a scenario of excluding the tasks with the resource usage quantities being below the reference level and supplying the resources, corresponding to the resource usage quantities of other tasks.

FIG. 16 illustrates one example of the determination flow of the dynamic definition of the recovery scenario when the disaster recovery site has no allowance in free space. In simpler terms, FIG. 16 illustrates a flow of the recovery scenario 23 in the case 3 and the case 4.

In OP41, the management apparatus 10 determines whether the index value X satisfies a relation of 0.2≤index value X<0.6. When satisfying 0.2≤index value X<0.6 (OP41: Yes), the processing advances to OP42. Whereas when not satisfying 0.2≤index value X<0.6 (OP41: No), the processing moves to the determination flow 3 of the dynamic definition.

In OP42, the management apparatus 10 determines whether the tasks of the disaster recovery site 30 contain a task having the relatively high resource usage quantity. When containing the task having the relatively high resource usage quantity (OP42: Yes) the processing advances to OP43. Whereas when not containing the task having the relatively high resource usage quantity (OP42: No) the processing diverts to OP45.

In OP43, the management apparatus 10 stops the task having the relatively high resource usage rate. Next, the processing advances to OP 44. In OP44, the management apparatus 10 recalculates the index value X, and determines whether a relation of index value X≥1.0 is established. When "index value X≥1.0" is established (OP44: Yes) the recovery scenario 23 in the case 3 is defined, and the processing is finished. The recovery scenario 23 in the case 3 is a scenario of supplying the resources by stopping the task having the relatively high resource usage rate on the disaster recovery site. Whereas when "index value X≥1.0" is not established (OP44: No) the processing diverts to OP45.

In OP45, the management apparatus 10 determines, after supplying the resources, whether there exists the task with the resource usage quantity being below the predetermined reference level. When there exists the task with the resource usage quantity being below the predetermined reference level (OP45: Yes) the processing advances to OP46. Whereas when there does not exist the task with the resource usage quantity being below the predetermined reference level (OP45: No), the recovery scenario 23 in the case 4 is defined, resulting in termination of the processing.

In OP46, the management apparatus 10 stops the task having the relatively high resource usage rate. Note that a relation of index value X<1.0 is established after the process in OP46, the processes in OP45 and OP46 are repeated till establishing "index value X≥1.0". Subsequently, the recovery scenario 23 in the case 4 is defined, and the processing is terminated. The recovery scenario 23 in the case 4 is a scenario of supplying the resources in a way that takes account of both of the predetermined reference levels of the resource usage rate and the resource usage quantity on the disaster recovery site.

FIG. 17 illustrates one example of the determination flow of the dynamic definition of the recovery scenario when the disaster recovery site has almost no allowance in free space. In simpler terms, FIG. 17 illustrates a flow of the recovery scenario 23 in the case 5.

In OP51, the management apparatus 10 determines whether the index value X satisfies a relation "index value X<0.2". When satisfying "index value X<0.2" (OP51: Yes), the processing advances to OP52. The processes of the determination flows 1 and 2 of the dynamic definition exclude the case of "index value X≥0.2", which means that "index value X<0.2" is normally satisfied. However, when not satisfying "index value X<0.2" (OP51: No), the processing may loop back to the determination flow 1 of the dynamic definition.

In OP52, the management apparatus 10 stops each of the tasks of the disaster recovery site 30. The recovery scenario 23 in the case 5 is defined, and the processing is terminated.

The recovery scenario 23 in the case 5 is a scenario of stopping the respective tasks of the disaster recovery site 30.

Operational Effect of Embodiment

The management apparatus 10 periodically collects the resource usage quantities of the tasks running on the real site 20 and the disaster recovery site 30 at the occurrences of the disaster and other equivalent situations, and redefines the recovery scenario 23, corresponding to the variations of the collected resource usage quantities. The management apparatus 10 is thereby enabled to automatically generate and implement the recovery scenario 23 matching with the resource usage statuses of the sites. A number of steps for maintaining and managing the recovery scenario 23 are also reduced.

The management apparatus 10 redefines the recovery scenario 23 so that the free resources of the disaster recovery site 30 become equal to or larger than the resource usage quantities of the real site 20. This redefinition enables the disaster recovery site 30 to avoid lacking in the resources.

The management apparatus 10 calculates, for ensuring the resource to be deficient, the resource usage rate of each task of the disaster recovery site 30, and stops the task having the higher resource usage rate than other tasks. A range of affecting the tasks running in progress on the disaster recovery site 30 can be thereby localized.

The management apparatus 10 also causes each task to supply the resource corresponding to the resource usage rate for ensuring the resource to be deficient. Note that the management apparatus 10 stops, may be sufficient, the task having the higher resource usage rate than other tasks when the resource allocated to the task is below the reference level due to the supply of the resource. The influence on the tasks running in progress on the disaster recovery site 30 is thereby reduced. The resources of the disaster recovery site 30 can be effectively utilized by localizing the range of affecting the tasks running in progress on the disaster recovery site 30 and thus reducing the influence.

At the occurrences of the disaster and other equivalent situations, the recovery scenario 23 is redefined, and the tasks of the real site 20 are migrated to the disaster recovery site 30, thereby enabling the management apparatus 10 to migrate the tasks corresponding to the running statuses on the both sites at the occurrences of the disaster and other equivalent situations. The recovery scenario 23 is not redefined when the resource usage statuses of the real site 20 are not collected at the occurrences of the disaster and other equivalent situations, in which case it may be sufficient that the management apparatus 10 migrates the tasks according to the immediately preceding recovery scenario 23. It is thereby feasible to perform the migration corresponding to the running statuses being closer to when the disaster and other equivalent situation occur.

The management apparatus, the information processing system and the management program of the disclosure can avoid lacking in the resources on the disaster recovery site and can effectively utilize the resources on the disaster recovery site when migrating the tasks of the active operation site to the disaster recovery site.

Non-Transitory Recording Medium

A program for making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and execute the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. A hard disc, a ROM and other equivalent recording mediums are given as the non-transitory recording mediums fixed within the computer and other equivalent apparatuses. Still further, a solid state drive (SSD) is also available as the non-transitory recording medium removable from the computer and other equivalent apparatuses and also as the non-transitory recording medium fixed within the computer and other equivalent apparatuses.

All examples and conditional language provided herein are intended, for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus comprising a processor:
   to collect resource usage quantities of one or more first site processes executed on an information processing apparatus of a first site, and the resource usage quantities of one or more second site processes executed on an information processing apparatus of a second site to which the first site processes are migrated;
   to calculate based on the resource usage quantities collected by the processor a resource usage rate of a resource usage quantity of each of the second site processes to a total of the resource usage quantities of the second site processes; and
   to define, as resource control information, reducing resources allocated to each of the second site processes according to the resource usage rate of the resource usage quantity of each of the second site processes calculated by the processor.

2. The management apparatus according to claim 1, wherein the processor defines the resource control information so that quantities of free resources of the information processing apparatus of the second site become equal to or larger than a total of the resource usage quantities of the first site processes.

3. The management apparatus according to claim 1, wherein the processor defines, as the resource control information, stopping a second site process having the resource usage rate higher than other second site processes.

4. The management apparatus according to claim 1, wherein the processor, when the resource usage quantity of any one of the second site processes after reducing the allocated resources becomes below a predetermined reference value, defines, as the resource control information, stopping the process having the resource usage rate higher than other second site processes.

5. The management apparatus according to claim 1, wherein the processor is further configured to change the resource usage quantity allocated to each of the second site processes in accordance with the resource control information, and to migrate the first site processes to the information processing apparatus of the second site.

6. An information processing system comprising:
   a management apparatus;
   an information processing apparatus of a first site; and an information processing apparatus of a second site,
   the management apparatus including a processor:
   to collect resource usage quantities of one or more first site processes executed on the information processing apparatus of the first site, and the resource usage quantities of one or more second site processes executed on the information processing apparatus of a second site to which the first site processes are migrated;
   to calculate based on the resource usage quantities collected by the processor a resource usage rate of a resource usage quantity of each of the second site processes to a total of the resource usage quantities of the second site processes; and
   to define, as resource control information, reducing resources allocated to each of the second site processes according to the resource usage rate of the resource usage quantity of each of the second site processes calculated by the processor.

7. A non-transitory computer-readable recording medium having stored therein a program for causing a management apparatus to execute a management process comprising:
   collecting resource usage quantities of one or more first site processes executed on an information processing apparatus of a first site, and the resource usage quantities of one or more second site processes executed on an information processing apparatus of a second site to which the first site processes are migrated;
   calculating based on the resource usage quantities collected by the management apparatus a resource usage rate of a resource usage quantity of each of the second site processes to a total of the resource usage quantities of the second site processes; and
   defining, as resource control information, reducing resources allocated to each of the second site processes according to the resource usage rate of the resource usage quantity of each of the second site processes calculated by the management apparatus.

* * * * *